Aug. 20, 1940.　　　　E. W. STACEY　　　　2,211,840
MACHINE FOR CUTTING SHEET STOCK
Filed April 14, 1939　　　　7 Sheets-Sheet 3

INVENTOR
Ernest W. Stacey
By his attorney
Victor Cold

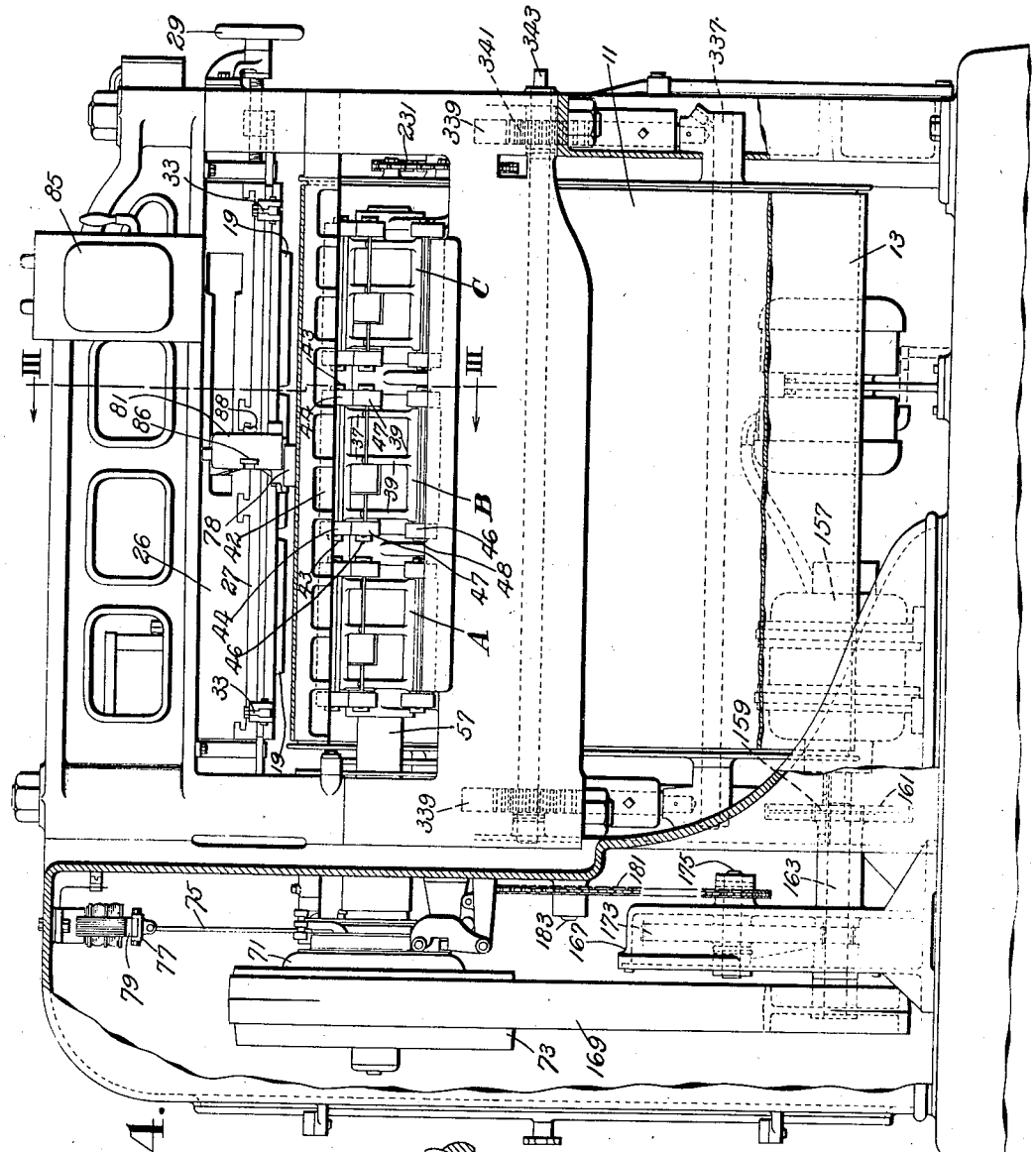

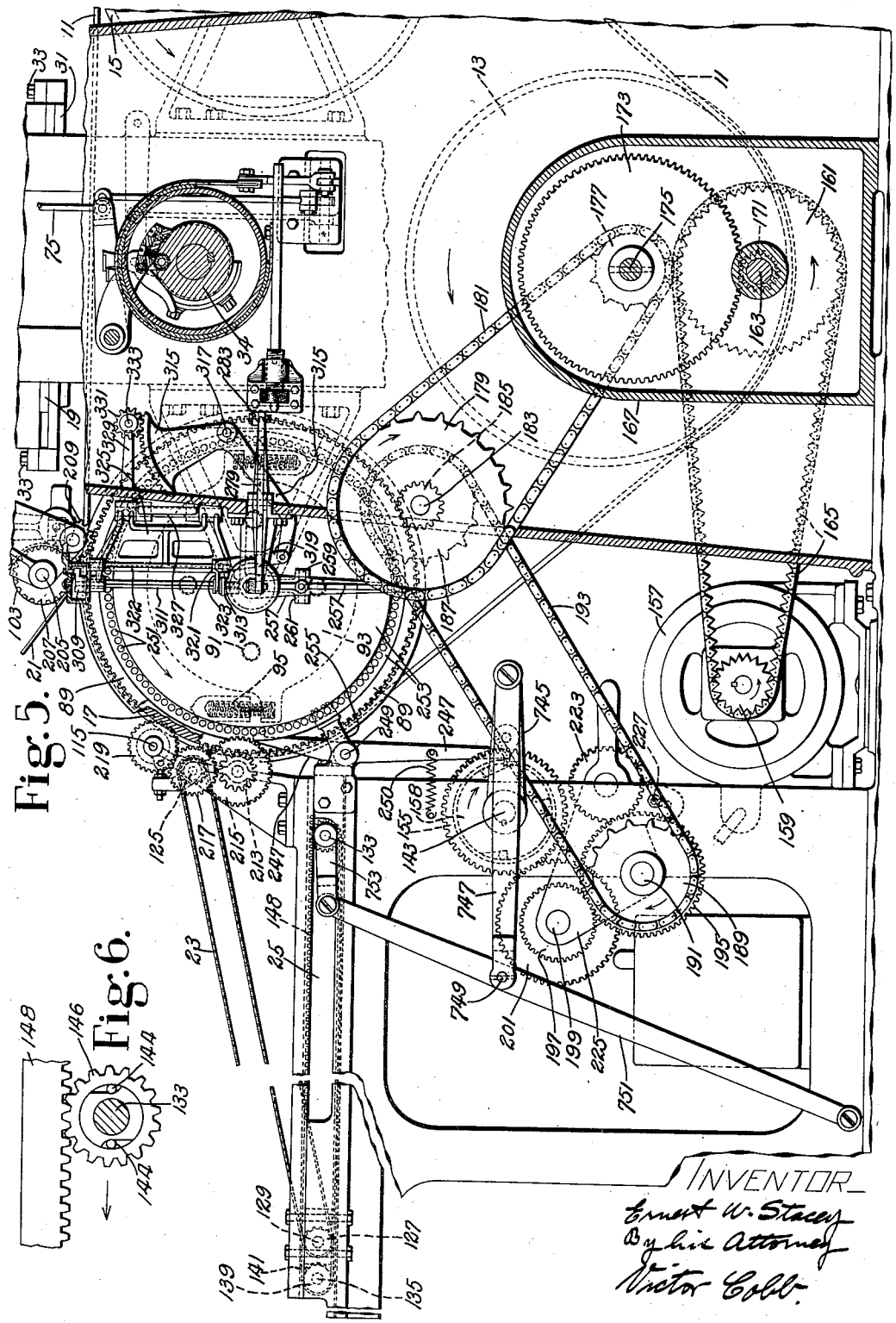

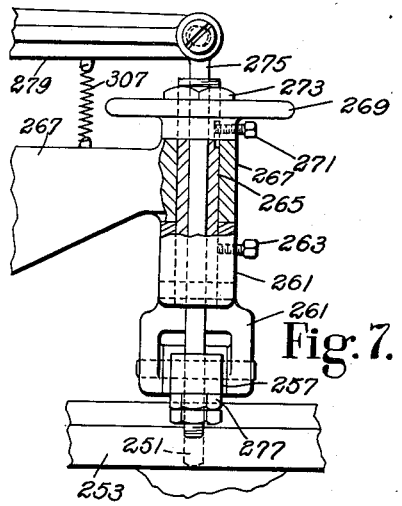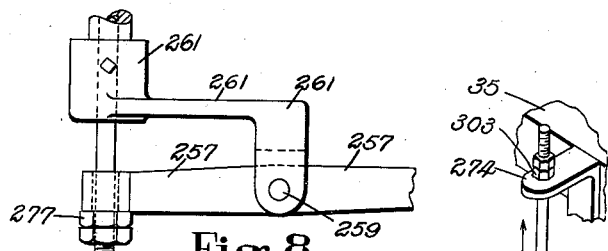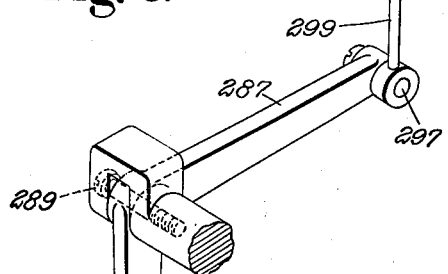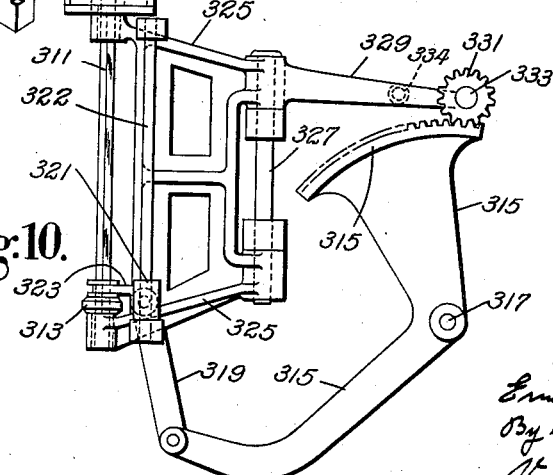

Patented Aug. 20, 1940

2,211,840

UNITED STATES PATENT OFFICE 2,211,840

MACHINE FOR CUTTING SHEET STOCK

Ernest W. Stacey, Beverly, Mass., assignor to United Shoe Machinery Corporation, Borough of Flemington, N. J., a corporation of New Jersey Application April 14, 1939, Serial No. 267,855

18 Claims. (Cl. 164—20)

This invention relates to machines for cutting articles successively from a sheet of stock and is herein illustrated as embodied in a machine for cutting uppers from a sheet of rubber stock.

A common procedure in making uppers for gum shoes or rubbers is to produce by calendering sheets of rubber stock of a proper thickness upon which a plurality of designs are embossed by the calender rolls, and then to cut uppers from these sheets in such manner that the designs are properly located in the cut-out uppers. These designs are arranged in rows extending across the sheet, the rows succeeding one another along the sheet from end to end. Such designs may have the outline of the throat of an upper and are commonly raised beads which provide finished edges for the throats of the uppers in the completed shoes. In United States Letters Patent No. 1,760,019, granted May 27, 1930, upon an application filed in my name, there is disclosed a machine for cutting uppers from such an embossed sheet. In that machine a sheet with beaded designs embossed upon it is carried by a conveyor past cutting mechanism which is operated to cut out a row of uppers, the operation of the cutting mechanism being caused to take place by an operator who watches the rows of designs pass by a sight-opening and thereupon manipulates a treadle to cause the cutting mechanism to operate.

In the illustrated machine, when embossed sheets are to be operated upon, the displacing of a feeler by engagement with a design closes a contact switch, thereby energizing a solenoid which acts to throw in a one-revolution clutch to cause operation of the cutting mechanism.

Although, as has been explained above, it is common to prepare sheets of rubber stock with designs formed upon them and then to cut out articles in such manner as to embody the designs in the articles, it is also common to produce sheets which are plain and to cut the articles from such sheets. In order to provide for cutting articles from plain sheets if desired, each sheet is fed as before past the cutting mechanism, and that mechanism is caused to operate at regular intervals. The cutting operation in this case is controlled in the illustrated machine by a rotary switch, which is driven by a continuously rotating element of the machine; and this switch energizes at regular intervals the same solenoid which the feeler energizes when embossed sheets are being operated upon. In order to adapt the machine for operation either upon embossed sheets or upon plain sheets, means are provided for supplying current either to the contact switch or to the rotary switch, as may be desired, so that the selected switch energizes the solenoid and controls the operation of the cutting mechanism.

These and other features of the invention, including certain details of construction and combination of parts, will be described as embodied in an illustrated machine and pointed out in the appended claims.

Referring now to the accompanying drawings:

Fig. 4 is a front elevation of the machine;

Fig. 4a is a detail, partly in section and partly in elevation, showing a part of one of the toggle mechanisms;

Fig. 5 is a view, partly in side elevation and partly in vertical section, of a portion of the machine;

Fig. 6 is a detail in elevation of the one-way clutch which causes the chains of the delivery frame to be actuated;

Fig. 7 is a detail, principally in plan, showing the mounting of the pin-moving lever;

Fig. 8 is an elevation of certain parts which are shown in Fig. 7, as viewed from the right of said figure;

Fig. 9 is a perspective of the links and levers through which the pin-moving lever is actuated by movement of the platen;

Fig. 10 is a detail in elevation of the mounting of the rotary switch; and

Figure 1:
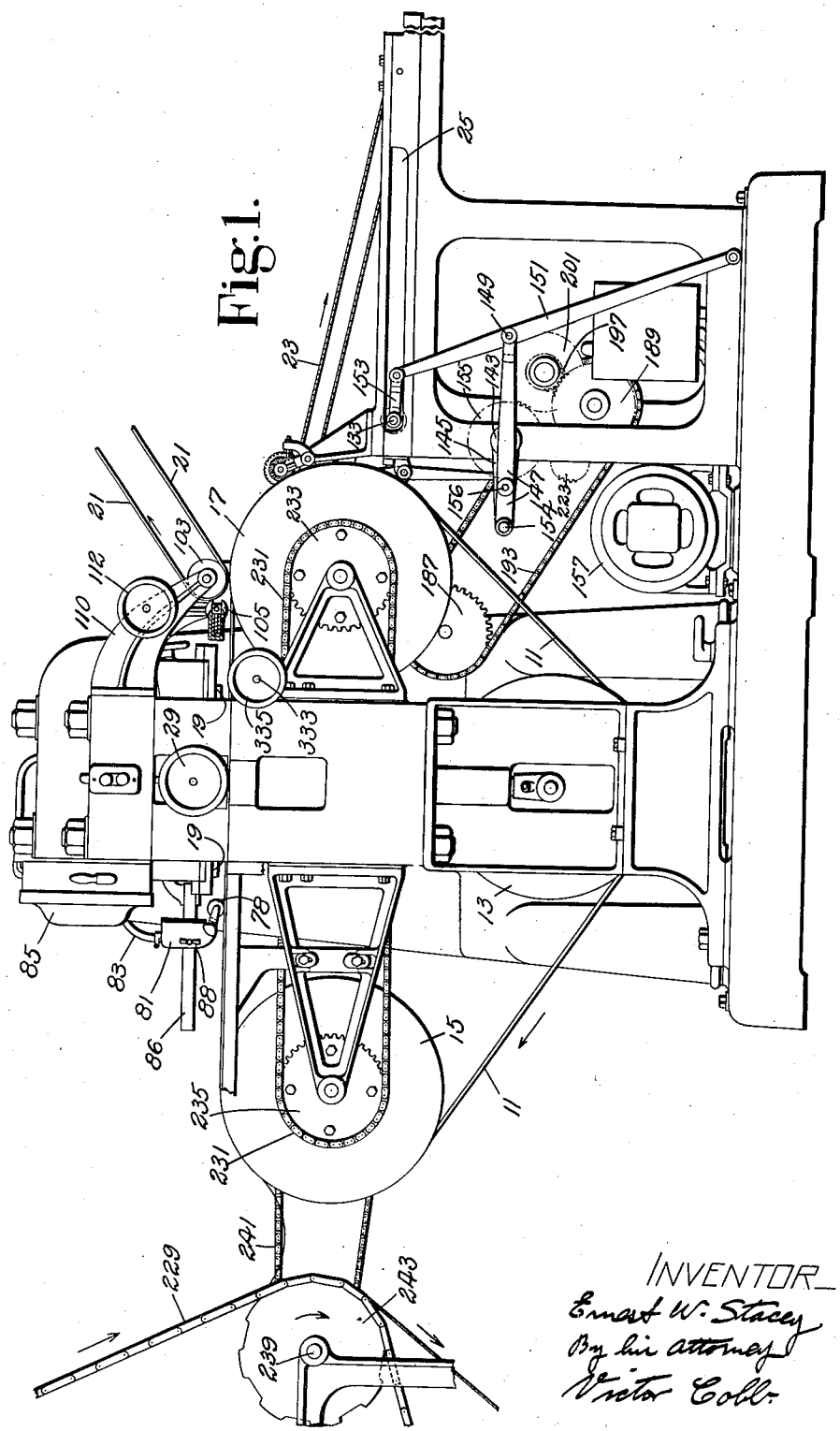
Fig. 1 is a side elevation of a machine in which the present invention is embodied.
Figure 2:
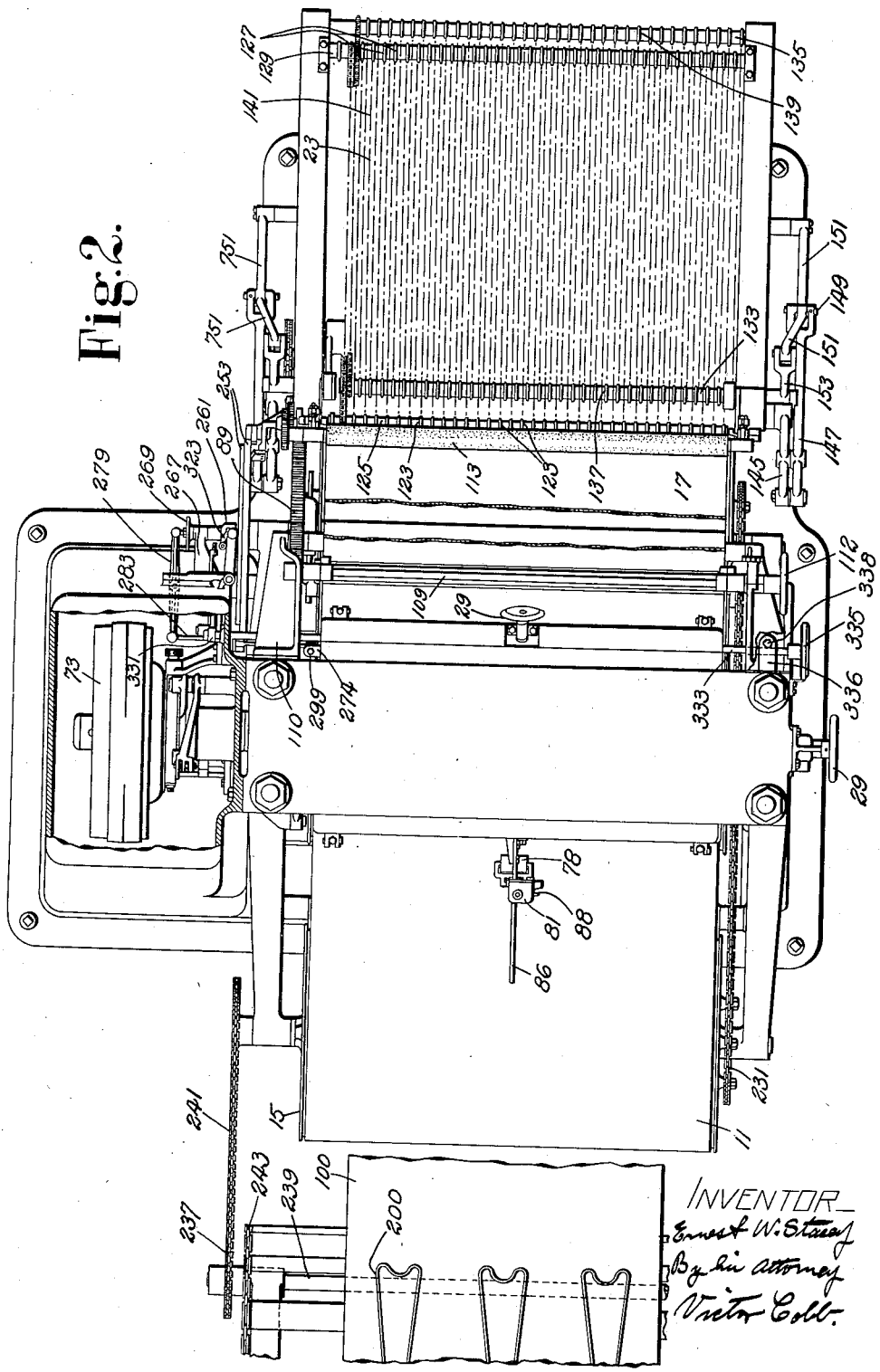
Fig. 2 is a plan of the machine.

Referring first to Figs. 1 and 2, the general mode of operation of the machine will be described. The sheet of rubber stock 100 with its raised beads 200 which in the cut-out uppers will extend around the throats of said uppers, is led from a reel, not shown, to the upper horizontal run of an endless rubber belt 11, which travels around three triangularly arranged drums 13, 15, 17. Above the upper horizontal run of the work supporting belt 11 (Fig. 3) is a stationary crosshead which carries a set of dies 19, three being provided; and below the horizontal run of the belt is a platen 35 which is moved up at intervals to cause the dies to cut from the sheet of rubber stock a series of uppers. Before the machine is started the leading end of the sheet is drawn beneath the crosshead and upon the upper run of a belt 21, so that when the machine is operating the sheet of scrap is thus carried away. The cut-out uppers, which remain on the work supporting or cutting belt 11, are transferred from that belt to a plurality of spaced inclined chains 23 (Fig. 1). From these inclined chains they are transferred to another set of spaced chains mounted upon a delivery frame 25, which is reciprocated horizontally below the chains 23; and from this horizontally reciprocating frame the uppers are dropped upon the leaves of a book (not shown) in which they are stored until they are to be incorporated in shoes. The machine, as thus far described, is substantially the same as the machine of the patent, with the exception that in the patented machine the dies are moved down to cut the uppers from the sheet of rubber, whereas in the present machine the belt 11 with the sheet upon it is forced up against the dies.

Figure 3:
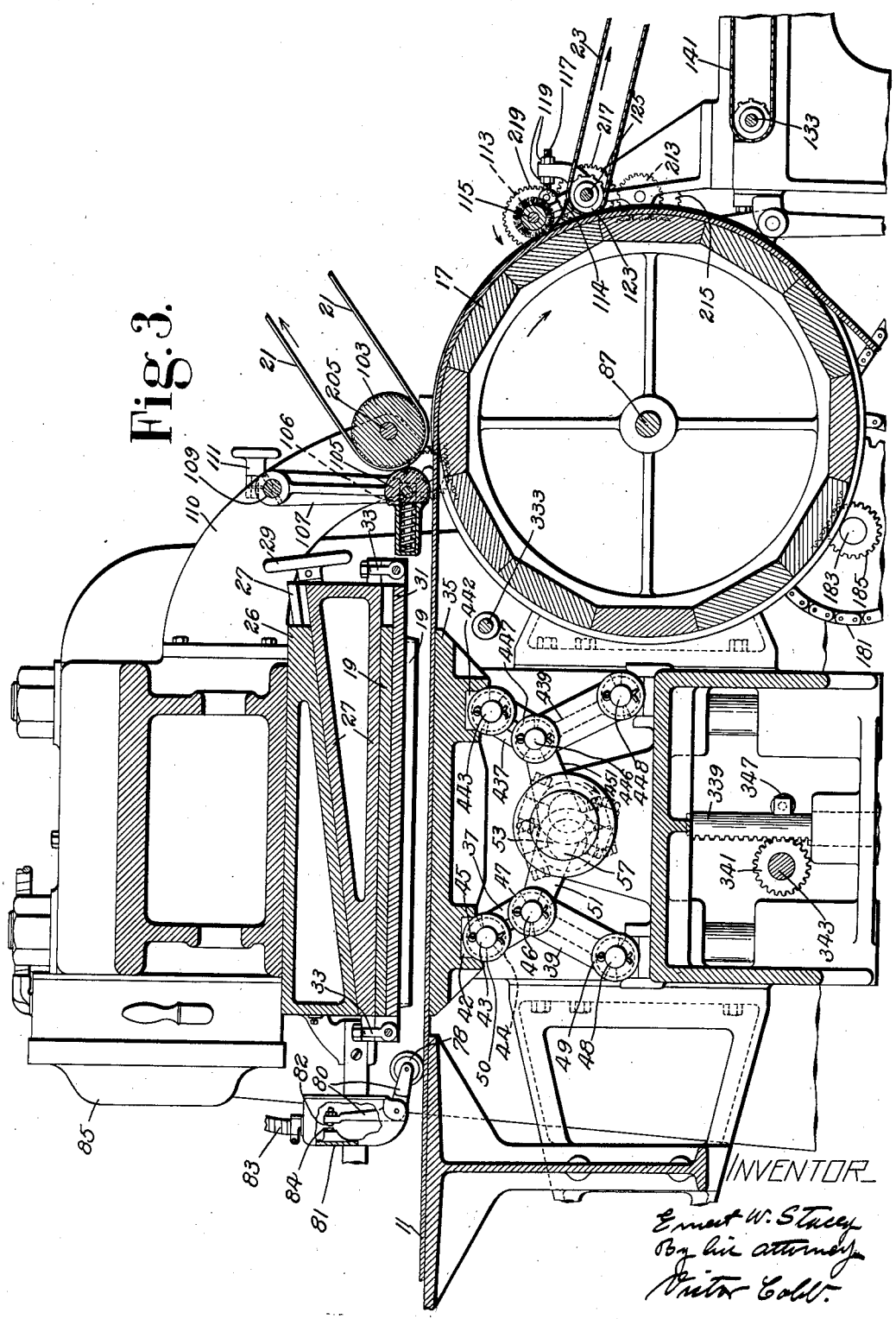
Fig. 3 is a section of a portion of the machine on the line III—III of Fig. 4.

Referring now to Figs. 3 and 4, the crosshead carries a member 26 having an inclined lower face, said member being provided with T slots parallel to its lower face in which are received T-shaped slides formed on the upper portion of a wedge 27. A screw having at its outer end a hand wheel 29 is threaded into the member 26, said screw being rotatably mounted in a part of the wedge 27 but held from longitudinal movement with respect to said wedge. The dies 19 are integral with a base in the form of a plate, from the lower face of which the dies project, and this plate is clamped to the bottom of the wedge 27 by a clamping plate 31 having pivoted along its edges latches 33 in the form of bolts provided with nuts on their upper ends. These bolts may be swung up into the positions shown in which their stems are located in slots formed in ears on the wedge 27, and when the nuts are screwed down the dies are firmly held. With this construction, by turning the hand wheel 29, the vertical position of the dies may be varied.

The horizontal run of the work supporting belt 11 with the sheet of rubber stock upon it is forced up against the dies by the vertically movable platen 35 (Fig. 3), which is actuated by three double sets of toggle mechanisms, three front pairs of toggle links and three rear pairs. Referring to Fig. 4, the three front pairs of links of the three sets of mechanisms are indicated, respectively, at A, B and C, but since the toggle mechanisms are alike only one of them will be described. The toggle mechanism indicated at B in Fig. 4 consists of two front toggle links, which appear in this figure and two rear toggle links which lie behind the front links, both the front and the rear pair of toggle links appearing in Fig. 3. The front pair of toggle links consists of a wide upper link 37 having three strengthening ribs and a lower link 39 having three similar ribs, said lower link being of the same width as the upper link. The upper and lower links are in line with each other, so that they occupy a smaller space sideways than they would occupy if they were not in alinement; and since they are in alinement it is necessary to provide for them a particular construction of bearings. Fast to the underside of the platen 35 is a partial bearing 42 for a pivot pin 43, the underside of the pin resting in a partial bearing formed at the upper end of the upper link 37. These two partial bearings (Fig. 4ᵃ) are held from separating by collars 44, one at each end of the members 42, 37, said collars fitting over partially cylindrical ends on the members. Cotter-pins 45 and washers 50 at each end of the pivot pin 43, prevent movement of the members 42, 37 longitudinally of the pin. The partial bearings on the block 42 and on the upper link 37 are so constructed that there are tapered spaces between them, such that the link 37 can swing on the pivot pin 43. The lower end of the upper link 37 has a partial bearing which rests upon the upper side of a pivot pin 46, the lower side of which is supported by a partial bearing formed at the upper end of the lower link 39, these two partial bearings being held together by cotterpins, collars and washers in the same manner as are the partial bearing 42 and the partial bearing in the upper end of the link 37, one of the washers being indicated at 47. The lower end of the lower link 39 has a partial bearing which rests upon a pivot pin 48, the underside of which is supported by a partial bearing fastened to the frame of the machine. Cotter-pins, collars and washers like those shown in Fig. 4ᵃ hold the partial bearings together, one of the washers being indicated at 49. All of these pairs of partial bearings have spaces between them to permit the links to swing on their pivots. A link 51 having its outer end pivoted about the pin 46 has its inner end pivoted about a crank pin 53 carried by a rotary shaft 57. The rear members of the toggle mechanism B are like the front members and to the corresponding parts have been given corresponding reference numerals increased by 400. The details of construction of the particular toggle mechanism shown form no part of the present invention, and any suitable mechanism may be employed, it being understood that when the shaft 57 makes one revolution from the position shown, the platen 35 is first moved up to cause the dies 19 to cut out a series of uppers from the sheet of rubber stock and is then lowered into the position shown.

The rotation of the shaft 57 (Fig. 4) is caused by a one-revolution clutch, indicated as a whole at 71, which connects the shaft at proper times with a rotating pulley 73. The details of construction of the clutch form no part of the present invention and any suitable one-revolution clutch may be employed. The clutch is rendered operative to impart one revolution to the shaft 57 by pulling up a rod 75. The upper end of the rod has pivoted to it a yoke 77 between the arms of which is pivoted the lower end of the core 79 of a solenoid, the construction being such that when the solenoid is energized the rod 75 is pulled up; and, when the solenoid is deenergized the rod descends, the clutch being so constructed that it comes to rest after a single revolution. In the cutting of embossed stock the solenoid is energized when a feeler in the form of a small roll 78 (Fig. 3) encounters the middle one of the beads 200 (Fig. 2) and is thereby raised. Raising the feeler (Fig. 3) which is carried at the lower end of a bell crank lever 80 brings together two contact points 82, 84 and through suitable electrical connections, which will be explained later, causes the solenoid to be energized to throw in the clutch and thus to cause a revolution to be imparted to the shaft 57. The timing of the energizing of the solenoid is such that the platen 35 is pushed up to cause the dies to cut out uppers from the sheet stock when a beaded portion 200 occupies the proper position beneath the dies. The contact switch, comprising the points 82, 84, is contained in a small housing 81 by which the feeler is carried and is connected through a cable 83 with a control box 85, which contains a double-throw switch, two magnetic switches and a transformer, later to be referred to. The feeler housing 81 (Fig. 2) is adjustable forward and back along a horizontal bar 86 upon which it is slidably mounted and is held in adjusted position by a set screw 88.

The dieing-out operation takes place so quickly that in general it is possible to drive the belt and thus to feed the sheet of rubber stock continuously. The dies cut through the sheet of rubber stock into the belt 11 and consequently if the dieing-out operation should not take place fast enough the belt would be stopped momentarily. In order to provide for this possibility, the drum 17 (Figs. 1 and 3), which drives the belt 11, is itself driven through a structure which may yield, if necessary. The drum 17 is fast to a shaft 87, one end of which carries the mechanism for driving the drum. Referring now to Fig. 5, a large gear 89, which drives the drum 17, is not rigidly fastened to the drum or its shaft but is connected to them in such manner that, if enough resistance is encountered by the drum, the gear can move through a short arc while the drum remains stationary or lags behind. To this end there is fastened by bolts 91 to one end of the drum 17 a generally circular plate 93 having two diametrically opposite sockets adapted each to receive one end of one of two compression springs 95; and the large gear 89 has extending from its adjacent face two lugs having sockets to receive the other ends of these springs. The springs 95 are comparatively strong so that when the gear 89 rotates it carries the drum 17 with it in the direction indicated by the arrow; but if the belt 11, which is being driven by the drum, is momentarily stopped by the action of the cutting dies, the gear can continue its rotation through a small arc by compressing the springs 95, such stopping of the belt, if it occurs, being of very short duration.

Referring to Fig. 3, it has been explained that the scrap sheet from which the uppers have been cut out passes up and is carried away upon the upper run of the belt 21. The left-hand end of this belt passes around a roll 103, and the scrap sheet is held against the belt by a small presser roll 105, which is rotatable on a small horizontal shaft having bearings at its ends in spring-pressed square blocks, one of which is shown at 106, said blocks being slidable in horizontal slots in the arms of a yoke at the lower end of a stem 107. The hub at the upper end of this stem is pinned to a shaft 109, which is rotatably mounted in a bracket 110 and in another similar bracket at the opposite side of the machine, said shaft being adapted to be clamped in adjusted angular position by turning a small hand wheel 111 which clamps about the shaft a split stationary bearing. A hand wheel 112 (Fig. 2) on one end of the shaft 109 furnishes means for turning said shaft to vary the pressure of the small roll 105 against the scrap sheet of stock.

From the belt 11 (Fig. 3) the cut-out uppers are delivered to the upper ends of the upper runs of the series of spaced chains 23, which extend at a slight downward inclination toward the rear of the machine; and inasmuch as these cut-out uppers tend to cling to the belt 11, means in the form of a deflecting plate 114 and rotating brush 113 is provided for disengaging them just as they are transferred to the chains 23. This brush is mounted on a small shaft 115 carried at the upper end of a stem, the hub of which is free to turn on a slender shaft 125 having gears which drive the chains 23. An eye-bolt 117, the eye of which receives a small pin on the stem which carries the brush, passes loosely through a bore in the upper end of a small stationary bracket and is threaded to receive nuts 119 by which it may be adjusted and locked in adjusted position.

The upper ends of the chains 23 (Figs. 2, 3 and 5) run around spaced sprockets 123 on the slender shaft 125, and the lower ends run around spaced sprockets 127 on a slender shaft 129, both shafts being rotatably mounted in bearings carried by the frame of the machine. Mounted for horizontal reciprocation in the frame of the machine below the upper run of the inclined chains 23 is the rectangular delivery frame 25, at the opposite ends of which are bearings for two more slender shafts 133, 135. The shaft 133 has a series of spaced sprockets 137, and the shaft 135 has a series of spaced sprockets 139. Around each sprocket 137 and its aligned sprocket 139 passes a chain 141, the chains being disposed between the outer ends of inclined chains 23 so that the delivery frame 25 with its chains 141 can be reciprocated horizontally without interfering with the chains 23. The construction and mode of operation of the inclined chains 23 and the delivery frame with its chains 141 are similar to those of the corresponding elements of the machine of the patent. The delivery frame comes to rest in the position shown with the leading portions of the chains 141 in proximity to the lower portions on the inclined chains 23. It is moved forward (to the right as viewed in Fig. 1) until it extends over a receiving device upon which the cut-out pieces are to be dropped. This receiving device, not herein shown but shown in the patent, consists of a book made of a plurality of leaves of fabric, the book lying open in position to have the cut-out uppers dropped upon one of the leaves. When a leaf has been filled with cut-out uppers arranged in non-overlapping relation, the operator turns the leaf to expose a fresh leaf. The uppers, which are sticky and flaccid, are thus stored without danger of adhering to one another. The reciprocation of the delivery frame is so timed that it starts its forward movement when a series of cut-out uppers reaches the lower portion of the chains 23, whereupon the uppers are transferred to the chains 141. These last-named chains are not being driven at this time; but, as soon as the delivery frame reaches the end of its forward movement at which time the uppers on the chain 141 are above the book, the frame begins its rearward movement and the chains 141 are driven in such manner that their upper runs move forward at the same rate that the delivery frame moves rearward. The result is that the uppers remain stationary until they drop off from the forward ends of the chains 141 and fall upon the book.

In order to cause the chains 141 to remain stationary with respect to the delivery frame 25 on the forward movement of the frame and to be driven so that their upper runs move in a direction opposite to that of the delivery frame when the frame moves backward, the shaft 133 carries a one-way clutch, as shown best in Fig. 6, which comprises a cage for rollers 144 and a ring gear 146, said ring gear meshing with a stationary rack 148. When the delivery frame moves forward, as indicated by the arrow, no rotation is imparted to the shaft 133, but when the delivery frame moves back the gear is rotated counterclockwise and the chains 141 are driven.

The delivery frame 25 is reciprocated from a shaft 143 (Fig. 1) by two cranks, one at each end of the shaft, and by two mechanisms connected respectively with the cranks as shown in Fig. 2. Inasmuch as the two cranks and their respective connecting mechanisms are the same, only the crank and the connecting mechanism at one side of the frame will be described. The crank 145 (Fig. 1) is pivoted at its outer end to one end of a link 147, the other end of which is pivoted at 149 to a long arm 151, the lower end of which is pivoted to the frame and the upper end of which is pivoted to one end of a short link 153, the other end of which is pivoted about one end of the small shaft 133 which is rotatably mounted in the delivery frame. It is desirable, for example when short uppers are being cut out, that the extent of reciprocation of the delivery frame 25 should be less than when longer uppers are being cut out. To this end the pivot 154, which is shown as connecting the outer end of the arm 145 with the left-hand end of the link 147, may be removed and put through holes in the arm and in the link which are nearer to the center of the rotary shaft 143, a hole in the link 147 being indicated at 156. The other mechanism for reciprocating the delivery frame is shown best in Figs. 2 and 5. Since it is substantially a duplicate of the one which has just been described, it will not be described in detail. However, its corresponding elements have been given reference numerals like those of the first mechanism except that they have been increased by 600. The shaft 143 (Fig. 5) is driven by a one-revolution clutch 158 of the Horton type from a constantly rotating gear 155, the shaft being connected, by mechanism presently to be described, to the gear for one revolution each time that cut-out pieces on the series of inclined chains 23 reach the lower end of said chains.

The mechanism for rotating the various rotatable members and for reciprocating the platen which supports the belt 11 will now be described. Referring to Figs. 4 and 5, an electric motor 157 has at one end of its shaft a small sprocket 159 around which, and around a larger sprocket 161 on a shaft 163, runs a chain 165. The shaft extends through a box 167 containing reduction gearing and carries at its free end a small pulley around which and around the large pulley 73 runs a belt 169. As has been explained, when the large pulley is connected to the shaft 57 through the one-revolution clutch which is thrown in by the action of the solenoid in pulling up the rod 75, the platen is forced up to cause the dies to cut out a series of uppers. Returning now to the gear box 167, the shaft 163 has fast to it a pinion 171 which meshes with a large gear 173 fast to a shaft 175 which also carries a pinion 177 around which and around a gear 179 on a shaft 183 passes a chain 181. Also fast to the shaft 183 are a pinion 185 and a sprocket 187. The pinion 185 meshes with the large gear 89 of the drum 17. Around the sprocket 187 and around a sprocket 189 on a shaft 191 passes a chain 193, said shaft carrying a gear 195 which meshes with a gear 197 on a shaft 199. This last-named shaft also carries a gear 201 which meshes with the gear 155 so that said last-named gear is rotated constantly and, when connected to the shaft 143, imparts a single revolution to said shaft to reciprocate the delivery frame.

The belt 21, which carries away the scrap sheet of stock, passes around the roll 103 on a shaft 205 which also carries a gear 207, said gear meshing with a small gear 209 which also meshes with the large continually rotating gear 89.

The rotary brush 113 (Fig. 3) and the slender shaft 125 having the small gears 123 over which the chains 23 run are both driven from the large gear 89 of the drum 17. To this end (Fig. 5) a small gear 213 meshes with and is driven by the gear 89. Rigid with the small gear 213 is a larger gear 215 which meshes with a small gear on the shaft 125; and a gear 217 also on the shaft 125 meshes with a gear 219 on the shaft 115 of the brush.

It has been explained that the delivery frame 25 is reciprocated by means of the one-revolution clutch 158 (Fig. 5) which connects the continually rotating gear 155 with the shaft 143 and that this gear is rotated by the gears 201, 197, 195, sprocket 189 and chain 193, the chain being driven at a constant speed by sprocket 187. By this construction the peripheral speed of the gear 155 is constant and greater than the linear speed of the chain 193. It may be desirable to change the peripheral speed of the gear 155, for example to make it the same as the linear speed of the chain 193. To this end the shaft 199 is mounted at one end and the shaft of a gear 223 is mounted at the other end of a carrier in the form of a triangular plate 225 which is pivoted about the shaft 191, the plate being adjustable about said shaft and being held in adjusted angular position by a bolt 227 which passes through a slot in the plate and is threaded into the frame of the machine. By adjusting the plate 225, the gear 201 may be withdrawn from engagement with the gear 155, and the gear 223 simultaneously moved into engagement with it. The drive of the gear 155 will then be from the gear 189 through the gear 223.

The sheet rubber stock (Fig. 1) is led to the cutting belt 11 from a reel, not shown, as in the machine of the patent, driven by a chain 229 which in turn is driven from the drum 17 in the following manner. A chain 231 passes around a sprocket 233 which is bolted to the drum 17 and around a sprocket 235 which is bolted to the drum 15. On the farther end of the shaft of the drum 15 is a sprocket (Fig. 2) around which and around a sprocket 237 on a shaft 239 passes a chain 241, said shaft carrying also a sprocket 243 which drives the chain 229.

It is necessary that the reciprocating delivery frame should operate in correct timed relation with the cutting dies so that, after a series of uppers have been cut out and have traveled along the rubber belt 11 and down the inclined chains 23, the horizontally reciprocating delivery frame will be in position to receive them. The reciprocation of this delivery frame, it has been explained, is caused by the operation of the one-revolution clutch 158 (Fig. 5). The details of construction of the clutch form no part of the present invention, and any suitable one-revolution clutch may be used. The present one is thrown in and out by a lever 247 which is pivoted at 249 and is normally held in position to render the clutch inoperative by a tension spring 250. Swinging this lever 247 clockwise and then releasing it causes the clutch to impart one revolution to the shaft 143. The upper end of the lever 247 lies in the path of a selected one of a plurality of pins 251 slidably mounted in transverse bores near the periphery of a disc or plate 253, which is carried by the drum 17 so that, when this selected pin strikes the upper end of the lever and swings it momentarily clockwise, one revolution will be imparted to the shaft 143 to cause the delivery frame 25 to make a complete reciprocation. After the selected pin has swung the lever it encounters a stationary cam member 255 which slides the selected pin back into inoperative position in its bore. The selected pins which thus swing the lever 247 to throw in the clutch 245 are pushed partly out of their bores (away from the observer as viewed in Fig. 5) by the lower end of a lever 257 pivoted about a pin 259 in a fork 261.

Referring now to Figs. 7, 8 and 9 in connection with Fig. 5, the end of the lever 257, which is farthest from the observer, as viewed in Fig. 7, is swung down, as viewed in that figure, in order to push one end of a selected pin 251 far enough out of its bore in the disc 253 so that the pin will engage the clutch-controlling lever 247. The fork 261 is formed at the outer end of an arm which extends at right angles from a hub with which it is integral, said hub being fastened by a set screw 263 to a sleeve 265. The sleeve passes through a bore in the outer end of a bracket 267 carried by the frame of the machine and through the hub. A hand-hold 269 on one end of the sleeve is connected to said sleeve by a keyway formed in the sleeve and a set screw 271 which extends into the keyway. Threaded upon the end of the sleeve beyond the hand-hold 269 is a lock nut 273 by which the hand-hold, the bracket and the hub of the fork 261 may be clamped together. The axis of the sleeve is at right angles to and passes through the center of the rotary disc 253 which carries the pins 251. Consequently, when the lock nut 273 has been loosened, the hand-hold 269 may be turned to rotate the fork 261 so as to locate the operative end of the pin-setting lever 257 at any desired angular position, so that when it is operated a desired pin will be pushed into position to be caused by the rotating disc 253 to contact with and swing the clutch-controlling lever 247. In order to swing the pin-setting lever 247 so as to push out a selected pin 251 in timed relation with the cutting out of a series of uppers from the sheet stock, said lever is operated through various levers and links (Fig. 9) from an ear 274 on the platen 35 (see also Fig. 2), upward movement of which causes the dies to operate. Referring again to Fig. 9, one end of the pin-setting or pin-moving lever 257 is in line with the bore in the sleeve 265. A slide rod 275 passes loosely through this bore so as to have some play therein and similarly through a bore in one end of the pin-setting lever 257, an adjusting nut 277 and a check nut being threaded on the end of the slide rod. When, therefore, a pull is exerted upon this rod, one end of the pin-setting lever 257 will swing with it about the pivot 259, and the free end of the lever 257 will push a selected pin 251 out into operative position. The outer end of the rod 275 is pivoted at 278 to one end of a lever 279, which is pivoted at its middle at 281 about a fixed pivot and at its other end to one end of a link 283. The other end of this link has a fork which carries by means of pivot screws, one of which is shown at 284, a square block 285, said block being pivoted about the stem of a screw 286 carried by one arm of a bell-crank lever 287, said lever being pivoted about a stationary screw 289. The free end of the other arm of the bell-crank lever 287 is pivoted at 297 to one end of a rod 299, the other end of which passes loosely through a bore in the ear 274 on the platen 35 and has threaded on its upper end a check-nut 303 and a lock nut. When, therefore, the platen 35 moves up, the pin-setting lever 257 is rocked about its pivot 259 to push one of the pins 251 part way out of its bore; and when the platen 35 descends the tension spring 307 (Fig. 7), which connects one arm of the lever 279 with the bracket 267, returns the lever to the position shown.

The machine, as thus far described, is designed to operate upon sheet rubber stock having embossed beads, such as 200 (Fig. 1), the main clutch 71 being operated by the movement of the feeler 78; and the auxiliary clutch 158, which acts to reciprocate the delivery frame, being operated by selected pins 251 (Fig. 5) in the disc 253 which rotates with the drum 17. When it is necessary to cut uppers from a sheet of rubber stock which has no embossed beads, the feeler 78 is rendered inoperative, and the main clutch 71 is operated at regular fixed intervals by a rotary switch 309, which is rotated by the rotating disc or plate 253 which carries the pins. Referring now to Figs. 5 and 10, the rotary switch 309 of this alternate controlling mechanism is fast to the upper end of a square shaft 311 on which is slidable a small roll 313, said roll being held against the rotary disc 253 and being driven by friction. The small roll 313 may be adjusted along the shaft 311 by swinging a bell-crank 315 about a fixed pivot 317, the generally horizontal arm of the bell-crank lever being connected by a link 319 with a block 321 slidably mounted upon a rod 322 which is parallel to the rotary shaft 311. The sliding block 321 is connected to the small friction driven roll 313 by a plate 323, said plate being fast at one end of the sliding block and having at its other end a fork, the arms of which extend into a groove in the hub of the small friction roll. The shaft 311 and the shaft 322 are mounted in bearings in a small frame 325 which is carried by a small vertical rod 327 rotatable in bearings which are rigid with the frame of the machine. Consequently, by swinging the small frame 325 out a slight distance from the face of the rotating disc 253, the rotary contact switch 309, may be rendered inoperative; and by swinging the frame in the opposite direction, this switch may be rendered operative. Means for so swinging the frame 325 are provided in the form of an arm 329 which is integral with the frame so that, when this arm is swung toward the observer (as viewed in Figs. 5 and 10), the frame 325 is swung away from the observer to cause the friction roll 313 to contact with the disc 253. The bodily swinging movement of the small friction roll 313 is very small, being of the order of $\frac{1}{16}$ of an inch. The arm 329 is urged at all times to swing toward the observer so as to swing the frame 325 away from the observer and to hold the friction roll 313 in contact with the rotating disc 253, by a compression spring 334 (Fig. 10) located between the arm 329 and a stationary part of the machine. In order to permit the operator to swing the arm 329 in the opposite direction so as to move the friction roll into inoperative position and at the same time, if desired, to swing the bell-crank lever 315 so as to adjust the friction roll 313 along its driving shaft 311, a small shaft 333 slidably and rotatably mounted in stationary bearings extends out to the front of the machine where (Fig. 2) it has fast to it a hand-hold 335. Near the front of the machine the shaft 333 passes through a pinch-bearing 336 which may be loosened and tightened by turning a pinch-screw 338, so that the shaft may be freed for sliding and rotating movement and then locked in the desired position. The shaft 333 carries at its end opposite the hand-hold 335 a pinion 331, one face of which, when the shaft is pulled out, engages the arm 329 (Fig. 10) and swings the frame 325 away from the face of the rotating disc 253 (Fig. 5) so as to move the friction roll 313 to inoperative position. The pinion 331 (Fig. 10) meshes with a rack formed upon the upper arm of the bell-crank lever 315, so that by turning the shaft 333 the friction roll 313 may be adjusted along its driving shaft 311 to vary the speed at which the rotor 309 is driven.

Referring to Figs. 3 and 4, the lower drum 13 around which the belt 11 runs is adjustable vertically to tighten the belt. To this end the bearings of the shaft 337 of said drum are supported respectively by two racks 339 with which mesh pinions 341 on a long shaft 343, so that by turning the shaft 343 the lower drum 13 may be raised and lowered. The racks 339 are acted upon by guide rolls 347 to hold them in mesh with the pinions 341.

Figure 11:
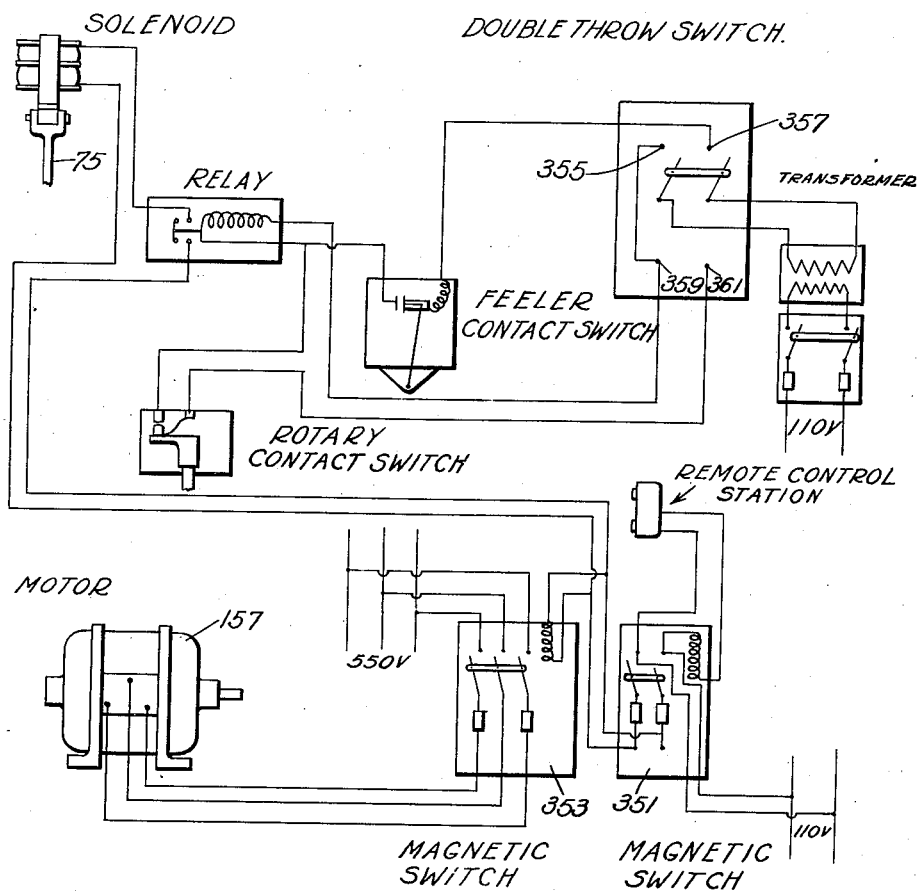
Fig. 11 is a diagram of the wiring system.

Referring to Fig. 11, which is a diagram of the electrical system, pushing the starting button at the remote-control station causes a magnetic switch 351 to be operated; and this in turn operates a second magnetic switch 353 to supply current to the three-phase motor 157 and connects the relay-controlled solenoid with the 110 volt mains so that, when the relay is operated, the solenoid will be energized to pull up the rod 75 and throw in the main clutch of the machine. With the double-throw switch in the neutral position shown, neither the feeler contact switch nor the rotary contact switch can operate the relay. If the double-throw switch is swung up it connects the terminals 355, 357 with the transformer; and the contact switch, when it makes contact, operates the relay to cause the solenoid to be energized. If the double-throw switch is thrown down to connect the terminals 359, 361 with the transformer, the rotary contact switch, when it makes contact, operates the relay to energize the solenoid.

Having described my invention, what I claim as new and desire to secure by Letters Patent of the United States is:

1. A machine for cutting articles successively from sheets of stock having in combination a cutting die, a conveyor for supporting and transporting the sheets, a platen over which the conveyor travels, mechanism operation of which causes relative movement of approach between the platen and the die to cut out articles, a solenoid energizing of which operates the mechanism, a contact switch and a rotary switch each adapted to energize the solenoid, and manual means for rendering a selected one of the switches operative.

2. A machine for cutting articles successively from sheets of stock having in combination a cutting die, a conveyor for supporting and transporting the sheets, a platen over which the conveyor travels, mechanism operation of which causes relative movement of approach between the platen and the die to cut out articles, a solenoid energizing of which operates the mechanism, a contact switch operable by portions of a sheet and a rotary switch operable independently of a sheet each adapted to energize the solenoid, and manual means for rendering a selected one of the switches operative.

3. A machine for cutting articles successively from a sheet of stock having in combination a die, a belt for supporting the sheet and feeding it past the die, means for causing the die to cut articles from the sheet, a drum over which the belt runs, a continuously rotating driving member, and yielding means through which the drum is rotated from the driving member.

4. A machine for cutting articles successively from a sheet of stock in accordance with the location of designs formed upon the sheet having in combination a cutting die, a belt for supporting and conveying the sheet, a platen over which the belt travels, toggle mechanism actuation of which causes the platen to press the sheet against the die, a feeler arranged to contact with the moving sheet in advance of the platen and die and to be displaced by engagement with a design, and mechanism thrown into operation by displacement of the feeler for actuating the toggle mechanism.

5. A machine for cutting articles successively from a sheet of stock in accordance with the location of designs formed upon the sheet having in combination a cutting die, means for feeding the sheet past the die, a feeler arranged to contact with the moving sheet in advance of the die and to be displaced by engagement with a design, a normally inoperative clutch operation of which causes the die to cut an article from the sheet, a solenoid energizing of which causes the clutch to operate, and means operated by displacement of the feeler for energizing the solenoid.

6. A machine for cutting articles successively from a sheet of stock having in combination a cutting die, means for feeding the sheet past the die, a clutch operation of which causes the die to cut an article from the sheet, mechanism for causing intermittent operation of the clutch, said mechanism comprising a solenoid, a rotary contact switch driven from a continuously rotating element of the machine, and means for causing the rotary switch to energize the solenoid.

7. A machine for cutting articles successively from a sheet of stock having in combination a cutting die, means for feeding the sheet past the die, a clutch operation of which causes the die to cut an article from the sheet, mechanism for causing intermittent operation of the clutch, said mechanism comprising a solenoid, a rotary contact switch driven from a continuously rotating element of the machine, means for causing the rotary switch to energize the solenoid, and means for varying the rate of rotation of the switch to vary the intervals between the intermittent cutting operations.

8. A machine for cutting articles successively from a sheet of stock having in combination a die, a platen, means for feeding the sheet past the platen and die, means for causing relative movement of approach between the platen and the die to cut out the articles, mechanism for delivering the cut-out articles, and means responsive to said relative movement of the die and platen for operating said delivery mechanism.

9. A machine for cutting articles successively from a sheet of stock having in combination a die, a platen, means for feeding the sheet past the die and platen, means for causing relative movement of approach between the die and the platen to cut out the articles, mechanism for delivering the cut-out articles, means responsive to said relative movement of the die and platen for operating the delivery mechanism, said last-named means including a rotatable member, a series of normally inoperative pins carried thereby, said pins being capable of being moved into operative position, means for so moving a pin, and adjustable means for selecting the pin which is thus moved.

10. A machine for cutting articles successively from a sheet of stock having in combination a die, a platen, means for feeding the sheet past the die and platen, means for causing relative movement of approach between said die and platen to cut out the articles, mechanism for delivering the cut-out articles, a clutch for operating said mechanism, means for controlling the actuation of the clutch, said means comprising a rotatable member, a series of normally inoperative pins mounted upon and movable with respect to said member, and means responsive to relative movement between the platen and the die to move one of the pins into operative position.

11. A machine for cutting articles successively from a sheet of stock having in combination a die, a platen, means for feeding the sheet past the die and platen, means for causing relative movement of approach between said die and platen to cut out the articles, mechanism for delivering the cut-out articles, a clutch for operating said mechanism, means for controlling the actuation of the clutch, said means comprising a rotatable member, a series of normally inoperative pins mounted upon and movable with respect to said member, means responsive to relative movement between the platen and the die to move one of the pins into operative position, and adjustable means for selecting the pin which is thus moved.

12. A machine for cutting articles successively from a sheet of stock having in combination means for feeding the sheet, cutting mechanism, means for operating the cutting mechanism, mechanism for delivering the cut-out articles, means for operating the delivery mechanism in timed relation to the operation of the cutting mechanism, said last-named means comprising a rotary member, a series of normally inoperative pins carried thereby, said pins being capable of being moved into operative position, and a lever for moving a selected pin into operative position.

13. A machine for cutting articles successively from a sheet of stock having in combination means for feeding the sheet, cutting mechanism, means for operating the cutting mechanism, mechanism for delivering the cut-out articles, means for operating the delivery mechanism in timed relation to the operation of the cutting mechanism, said last-named means comprising a rotary member, a series of normally inoperative pins carried thereby, said pins being capable of being moved into operative position, a lever for moving a selected pin into operative position, and means for adjusting the lever about the axis of rotation of the rotary member to select the pin which is to be moved.

14. A machine of the class described having in combination mechanism for cutting articles from a sheet of stock, mechanism for delivering the cut-out articles, a clutch for operating the delivery mechanism, means for controlling the operation of the clutch, said means comprising a rotary member, a series of circularly arranged normally inoperative pins carried thereby, a lever for moving a selected pin into operative position, and a slidable rod for operating the lever, the axis of the rod coinciding with the axis of rotation of the rotatable pin-carrying member.

15. A machine of the class described having in combination mechanism for cutting articles from a sheet of stock, mechanism for delivering the cut-out articles, a clutch for operating the delivery mechanism, means for controlling the operation of the clutch, said means comprising a rotary member, a series of circularly arranged normally inoperative pins carried thereby, a lever for moving a selected pin into operative position, a slidable rod for operating the lever, the axis of the rod coinciding with the axis of rotation of the rotatable pin-carrying member, and means for mounting the lever for adjustment about the axis of the slide rod.

16. A machine of the class described having in combination mechanism for cutting articles successively from a sheet of stock and mechanism for delivering the cut-out articles, said delivery mechanism comprising a frame, an endless member mounted on the frame and adapted to receive upon one of its runs the cut-out articles, means for moving the frame forward and rearward, and means becoming operative upon rearward movement of the frame for causing the article-supporting run of the endless member to move forward.

17. A machine of the class described having in combination mechanism for cutting articles successively from a sheet of stock and mechanism for delivering the cut-out articles, said delivery mechanism comprising a frame, shafts carried by the frame, a series of endless members mounted side by side upon the shafts and adapted to receive upon their upper runs the cut-out articles, means for reciprocating the frame forward and back, and means responsive to backward movement of the frame for causing the article-supporting runs of the endless members to move forward.

18. A machine of the class described having in combination mechanism for cutting articles successively from a sheet of stock and mechanism for delivering the cut-out articles, said delivery mechanism comprising a frame, shafts carried by the frame, a series of endless members mounted side by side upon the shafts and adapted to receive upon their upper runs the cut-out articles, means for reciprocating the frame forward and back, and a one-way clutch adapted upon backward movement of the frame to impart forward movement to the article-supporting runs of the endless members.

ERNEST W. STACEY.